Patented Sept. 2, 1947

2,426,864

UNITED STATES PATENT OFFICE 2,426,864

FUNGICIDES

Lloyd Crosser Felton, Baltimore, Md., assignor to Hynson, Westcott & Dunning, Incorporated, a corporation of Maryland No Drawing. Application January 30, 1946, Serial No. 644,435

2 Claims. (Cl. 167—30)

This invention relates to fungicides consisting essentially of substituted salicylaldehydes.

Previous attempts have been made to use halogenated salicylaldehydes as antiseptics but were unsuccessful due to the low solubilities. Unsubstituted salicylaldehyde has been tested as an antiseptic by applying it in the form of vapor. The salicylaldehydes (both substituted and unsubstituted) generally have been found to be too irritating and too sparingly soluble in aqueous solvents for use as antiseptics.

I have found that the substituted salicylaldehydes and their bisulfites may be rendered sufficiently soluble and non-irritating, by combination with an alkaline acting agent, for use as fungicides. Moreover, some of them have been found to possess considerable antiseptic activity against gram-negative and gram-positive organisms both in the laboratory and clinically. They have been tested both in vitro and in vivo on various fungal growths with marked success.

The substituted salicylaldehydes can be used either as such or in the form of their bisulfite compounds but in either case they must be neutralized by means of an alkali in order to increase their solubility and reduce their irritating properties.

The compounds embraced by my invention may be described as being salicylaldehydes which are substituted in at least one of the 3- and 5-positions by a halogen or a lower alkyl group while the other of said two positions is unsubstituted or is substituted by a halogen or by a lower alkyl group. The compounds are embraced by the formula

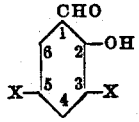

in which one X represents a member of the group consisting of the halogens and the lower alkyl groups and the other X represents a member of the group consisting of hydrogen, the halogens and the lower alkyl groups.

Dibromsalicylaldehyde is the preferred compound from the standpoint of cost and utility as a fungicide and antiseptic. On the other hand the dialkyl-substituted-salicylaldehydes and 3,5- diiodosalicylaldehyde, 5-tert-amylsalicylaldehyde and 5-tert-octylsalicylaldehyde have been found to be less desirable especially for use in the form of solutions.

The preferred alkaline agent for adjusting the pH value of the solutions of the substituted salicylaldehydes is borax especially when the free aldehyde, as distinguished from its bisulfite compound, is used. Borax in aqueous solution gives a pH value of about 9.5 which is a little higher than is desirable in a fungicide but borax may be mixed and reacted with the substituted salicylaldehydes in proportion to give a reaction product or solution having a pH value of from 7 to 8.5 which is suitable. The borax may be used with either the free aldehyde or with its bisulfite compound but whereas I have found it to be possible to adjust the pH value of an aldehyde bisulfite composition by means of a strong alkali such as caustic soda, I have obtained better results with the free aldehyde by the use of borax. The borax apparently acts not only to convert the aldehyde to its alkali metal salt but also as a buffer to establish and maintain the desired pH value. Other buffers may be used but borax is preferred from the standpoint of cost and effectiveness.

It follows from the foregoing discussion that a composition consisting essentially of dibromsalicylaldehyde and borax or their reaction products is my preferred product.

The preparation of the substituted salicylaldehydes and their bisulfite compounds is illustrated by the following examples:

1. *Preparation of dibromsalicylaldehyde and its bisulfite compound.*—To one mole of salicylaldehyde in 200 cc. of glacial acetic acid are added, dropwise with stirring over a period of one hour, two moles of bromine in 200 cc. of glacial acetic acid. The temperature of the reaction mixture may go as high as 60° C. After all the bromine has been added, the reaction mixture is stirred for an additional hour and poured into two liters of water. Filter off the product, wash thoroughly with water and suck dry. Other methods are of course available for the preparation of dibromsalicylaldehyde, the described method being merely illustrative.

The crude dibromsalicylaldehyde produced in this manner is dissolved in one liter of boiling alcohol and filtered. To this hot solution is added 120 g. of sodium bisulfite in 300 cc. of water. The aldehyde-bisulfite compound is filtered off after cooling and washed thoroughly with water and then with ether or alcohol.

2. *Preparation of p-tert-butylsalicylaldehyde and its bisulfite compound.*—To one mole of p-tert-butylphenol and 272 g. of sodium hydroxide in 500 cc. of ethanol and 600 cc. of water are added, dropwise with stirring over a period of 1½ hours, 204 g. of chloroform. Gentle refluxing is maintained by adjusting the rate of flow of the chloroform. After stirring an additional hour, the reaction mixture is made acid to Congo Red with concentrated hydrochloric acid and diluted with three liters of water. Wash non-aqueous layer with water and run into 200 cc. of saturated sodium bisulfite solution. Shake thoroughly until aldehyde-bisulfite compound crystallizes out and filter or centrifuge it off. The dry bisulfite compound can be decomposed with 10% sodium carbonate. The free aldehyde boils at 116–118° C./5 mm.

The above described procedures are representative and have been used for the preparation of many substituted salicylaldehydes including the following:

5-chlorsalicylaldehyde
5-bromsalicylaldehyde
5-iodosalicylaldehyde
3,5-dichlorosalicylaldehyde
3,5-dibromsalicylaldehyde
3,5-diiodosalicylaldehyde
3-brom-5-chlorsalicylaldehyde
5-tert-butylsalicylaldehyde
5-tert-amylsalicylaldehyde
5-tert-octylsalicylaldehyde
3-chloro-5-tert-butylsalicylaldehyde
3-bromo-5-tert-butylsalicylaldehyde The following are examples of the compositions in which the substituted salicylaldehydes and their bisulfite compounds have been successfully employed:

1. Aqueous liquid compositions
   A. 3% dibromsalicylaldehyde bisulfite compound
      3% sodium lauryl sulfate
      20% ethanol
      Balance water plus sufficient sodium hydroxide to bring the pH of the solution to between 7 and 8.5.
   B. 3% dibromsalicylaldehyde bisulfite compound
      3% borax
      Balance water.
   C. 3% dibromsalicylaldehyde bisulfite compound
      3% boric acid
      Balance water plus sufficient sodium hydroxide to raise the pH to between 7 and 8.5
   D. 2% dibromsalicylaldehyde
      3% borax
      Balance water.

E. Composition D above with an additional 2% of sodium lauryl sulfate gives a solution which dries more rapidly.

2. Ointments
   A. 3% dibromsalicylaldehyde bisulfite compound
      3% borax
      Balance, polyethylene glycol of the desired consistency.
   B. 3% dibromsalicylaldehyde bisulfite compound
      3% borax
      Balance cold cream base.

In the above compositions A and B, sodium hydroxide may replace the borax.

C. 2% dibromsalicylaldehyde
      3% borax
      Balance, polyethylene glycol of the desired consistency.

3. Dusting powders
   A. 3% dibromsalicylaldehyde bisulfite compound
      3% borax
      62% boric acid
      16% zinc oxide
      16% zinc stearate
   B. 3% dibromsalicylaldehyde bisulfite compound
      3% borax
      3% zinc stearate
      6% boric acid
      1% exsiccated alum
      Balance talc or pyrophyllite.
   C. 2% dibromsalicylaldehyde
      3% borax
      3% zinc stearate
      6% boric acid
      1% exsiccated alum
      Balance talc or pyrophyllite.

I claim:
1. A fungicidal composition consisting essentially of 3,5 dibromsalicylaldehyde and borax, said composition when dissolved in water having a pH value of from 7 to 8.5.
2. A fungicidal composition consisting essentially of a 3,5-dihalogen salicylaldehyde and borax, said composition when dissolved in water giving a solution having a pH value of from 7 to 8.5.

LLOYD CROSSER FELTON.

REFERENCES CITED

The following references are of record in the file of this patent:

UNITED STATES PATENTS

| Number | Name | Date |
|---|---|---|
| 1,911,551 | Cleveland | May 30, 1933 |

OTHER REFERENCES

Delauney, Chemical Abstracts, v. 31, 1937, page 8117. (Copy in library.)